US008307529B2

(12) United States Patent
Chapin et al.

(10) Patent No.: US 8,307,529 B2
(45) Date of Patent: Nov. 13, 2012

(54) PLUG REMOVAL METHOD AND APPARATUS

(75) Inventors: Curtis M. Chapin, Fort Worth, TX (US); John T. Schueler, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 458 days.

(21) Appl. No.: 12/652,354

(22) Filed: Jan. 5, 2010

(65) Prior Publication Data

US 2011/0162186 A1 Jul. 7, 2011

(51) Int. Cl.
*B25B 27/28* (2006.01)
*B23P 11/00* (2006.01)

(52) U.S. Cl. ........................................ 29/426.5; 29/270

(58) Field of Classification Search ................. 29/426.1, 29/426.5, 426.6, 700, 278, 280, 270; 254/18; 227/63; 81/53.2
See application file for complete search history.

(56) References Cited

U.S. PATENT DOCUMENTS

| | | | | |
|---|---|---|---|---|
| 438,410 | A | 10/1890 | Duffy | |
| 942,572 | A | 12/1909 | Leland et al. | |
| 4,007,913 | A * | 2/1977 | Aldrich | 254/18 |
| 4,154,122 | A | 5/1979 | Severin | |
| 4,224,969 | A | 9/1980 | Plessner | |
| 4,441,746 | A | 4/1984 | Corboy, Jr. | |
| 4,464,090 | A | 8/1984 | Duran | |
| 4,503,737 | A | 3/1985 | DiGiovanni | |
| 4,747,738 | A | 5/1988 | Duran | |
| 4,822,227 | A | 4/1989 | Duran | |
| 4,982,553 | A | 1/1991 | Itoh | |
| 5,017,069 | A | 5/1991 | Stencel | |
| 5,603,472 | A | 2/1997 | Hutter, III | |
| 5,819,611 | A | 10/1998 | Kozak | |
| 5,971,939 | A | 10/1999 | DeSantis et al. | |
| 6,315,485 | B1 | 11/2001 | Speck et al. | |
| 6,641,343 | B1 | 11/2003 | Duran | |
| 2008/0276438 | A1 | 11/2008 | King | |

FOREIGN PATENT DOCUMENTS

| | | |
|---|---|---|
| GB | 502348 | 3/1939 |
| GB | 602301 | 5/1948 |

* cited by examiner

*Primary Examiner* — John C Hong
(74) *Attorney, Agent, or Firm* — Reising Ethington P.C.; John J. Snyder

(57) ABSTRACT

A tool for removing plugs from recesses obviates the need for a twist of the wrist in engaging a plug for removal. A plunger is carried by a housing and is supported for reciprocal axial motion between extended and retracted positions relative to the housing. A shaft of the plunger includes a first threaded section that is engaged in a nut carried by the housing and has threads pitched to allow relative axial motion to be converted to relative rotation between shaft and housing. A second threaded section of the plunger shaft is configured to tap into a plug in response to shaft rotation in a tapping direction, and has a shallower thread pitch than the first threaded section.

20 Claims, 7 Drawing Sheets

PLUG REMOVAL METHOD AND APPARATUS

STATEMENT REGARDING FEDERALLY SPONSORED RESEARCH OR DEVELOPMENT

This invention was made with Government support under Contract Number N00019-02-C-3002 awarded by The Department of the Navy. The Government has certain rights in this invention.

CROSS-REFERENCES TO RELATED APPLICATIONS

Not Applicable

BACKGROUND

1. Technical Field

This invention relates generally to a method and apparatus for removing plugs from recesses.

2. Description of the Related Art Including Information Disclosed Under 37 CFR 1.97 and 1.98

It's known for a yankee screwdriver-type mechanism to be used to engage and remove a soft material plug from an opening. U.S. Pat. No. 438,410; issued 14 Oct. 1890 to Duffy, discloses a cork removal system including a plunger (O-N-S-Y) supported for translational motion between retracted and extended positions in a housing (M) and a plunger shaft (X) having a twisted section and carrying a threaded gimlet (Y) in the form of a corkscrew. The threads of the gimlet have a thread pitch at least as great as that of the twisted section of the plunger shaft. A lever arm (P) is manually actuated to move the plunger relative to the housing. A plunger handle (O-N) is connected to an aft end of the threaded shaft in a manner that allows for plunger shaft rotation relative to the handle. With the plunger in its extended position, the gimlet protrudes from a forward end of the housing. With the plunger in its retracted position, the gimlet is withdrawn into the housing. The twisted section of the plunger shaft is engaged in a nut (A) carried by the housing and threads of the twisted section are pitched to allow relative axial motion to be converted to rotational motion of the shaft relative to the housing. A rigid frame holds the housing, and also holds a bottle from which a cork is to be extracted, in fixed positions relative to one another. The axial distance that the plunger shaft travels (relative to the frame) to rotate and tap the gimlet into the cork, is equal to the depth that the gimlet reaches in the cork. The Duffy device may thus be used to engage a cork for withdrawal from a bottle by first mounting the bottle in the frame and then tapping the gimlet into the cork by actuating the lever arm to extend and rotate the plunger shaft. The cork may then withdrawn by actuating the lever arm in a reverse direction. This action retracts the plunger shaft, stripping off the cork as the gimlet is drawn back into the housing. However, because the Duffy system requires that the housing and workpiece (bottle) be maintained in a fixed axially-aligned relationship to one another, such a system would be unsuitable for use in applications requiring that a removal tool be handheld, e.g., for use in the extraction of plugs from multiple aircraft skin panel fasteners.

GB Patent No. 602,301 issued May 24, 1948 to Huntley, discloses a "combination tool" comprising a plunger shaft that may include a gimlet having threads pitched to tap. The plunger shaft is supported in a housing for axial motion between retracted and extended positions and is axially spring-loaded toward the retracted position.

GB Patent No. 502,348 issued Mar. 13, 1939 to Bradshaw; and U.S. Pat. No. 942,572 issued Dec. 7, 1909 to Leland et al.; and U.S. Pat. No. 4,224,969 issued Sep. 30, 1980 to Plessner; each discloses a "yankee screwdriver" arrangement including a plunger shaft supported for axial motion between retracted and extended positions in a housing, and threadedly engaged in a nut carried by the housing. In each case the plunger shaft includes threads pitched to allow axial motion to be converted to rotational motion.

U.S. Pat. No. 5,971,939 issued Oct. 26, 1999 to DeSantis et al. discloses a biopsy device including a plunger shaft supported for axial motion in a housing and spring-loaded to a retracted position. The device also includes finger tabs extending from the housing to allow for one-handed control of plunger shaft position relative to the housing.

SUMMARY OF THE INVENTION

An apparatus is provided for removing plugs from recesses. The apparatus includes a housing and a nut carried by the housing. A plunger is carried by the housing and is supported for reciprocal axial motion between extended and retracted positions relative to the housing. The plunger includes a plunger shaft having a first threaded section threadedly engaged in the nut and including threads pitched to allow relative axial motion to be converted into relative rotation between the plunger shaft and the housing. A second threaded section at a forward end of the plunger shaft may be configured to tap into a plug comprising softer material in response to shaft rotation in a tapping direction. The second threaded section of the plunger shaft may have a shallower thread pitch than the first threaded section. This arrangement allows an operator to tap the second threaded section into a plug while holding the apparatus in one hand, and uses relative housing motion, rather than a twist of the operator's wrist, to cause shaft rotation in the tapping direction. The shallower thread pitch of the second threaded section of the plunger shaft more securely embeds the second threaded section in a plug by tapping more turns of thread into a plug for a given amount of relative housing translation. The shallower thread pitch also limits depth of penetration into a plug for a given amount of relative axial motion between housing and plunger shaft, and frictionally prevents or at least limits relative rotation between a plug and the plunger shaft in response to aft axial movement of the plunger shaft as the apparatus is moved axially aft to pull a plug from its recess.

The handedness of the second threaded section of the plunger shaft may be opposite that of the first threaded section so that forward housing motion relative to the plunger shaft (retraction of the plunger shaft) causes plunger shaft rotation in the tapping direction. This forward housing motion may be driven by axially biasing, e.g., spring-loading, the plunger toward the retracted position so that an operator can cause the second threaded section to rotate in the tapping direction by allowing the axial bias (spring-loading) to move the housing forward relative to the plunger.

The plunger may include a plunger head that is connected to an aft end of the plunger shaft in a manner that allows for plunger shaft rotation relative to the handle, and the housing may include finger tabs that extend laterally from an aft end of the housing. This allows one-handed control of plunger position relative to the housing, and allows the heel or thumb of an operator's hand to engage and push axially against the plunger head without impeding plunger shaft rotation.

Also provided is a method for using the above-described apparatus to remove plugs from recesses. According to the method, the second threaded section of the plunger shaft is extended from the housing by moving the plunger shaft toward its extended position. A forward tip of the second threaded section of the plunger shaft is then be engaged against the plug and the second threaded section tapped into the plug by pressing the tip of the second threaded section against the plug and moving the housing axially relative to the plunger such that the plunger shaft is driven in rotation relative to the plunger handle, housing, and plug in a tapping direction. The plug may then be withdrawn by pulling the apparatus aft with the second threaded section carrying the plug.

Where the first and second threaded sections of the plunger shaft are threaded in opposite directions, and where a spring is positioned to bias the plunger toward the retracted position, the second threaded section may be tapped into a plug by allowing the spring bias to move the housing axially forward relative to plunger such that the plunger shaft is driven in rotation relative to the plunger handle, housing, and plug in the tapping direction. The plug may be stripped from the second threaded section by allowing the spring bias to draw the second threaded section back into a retracted position within a housing.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figure 2:
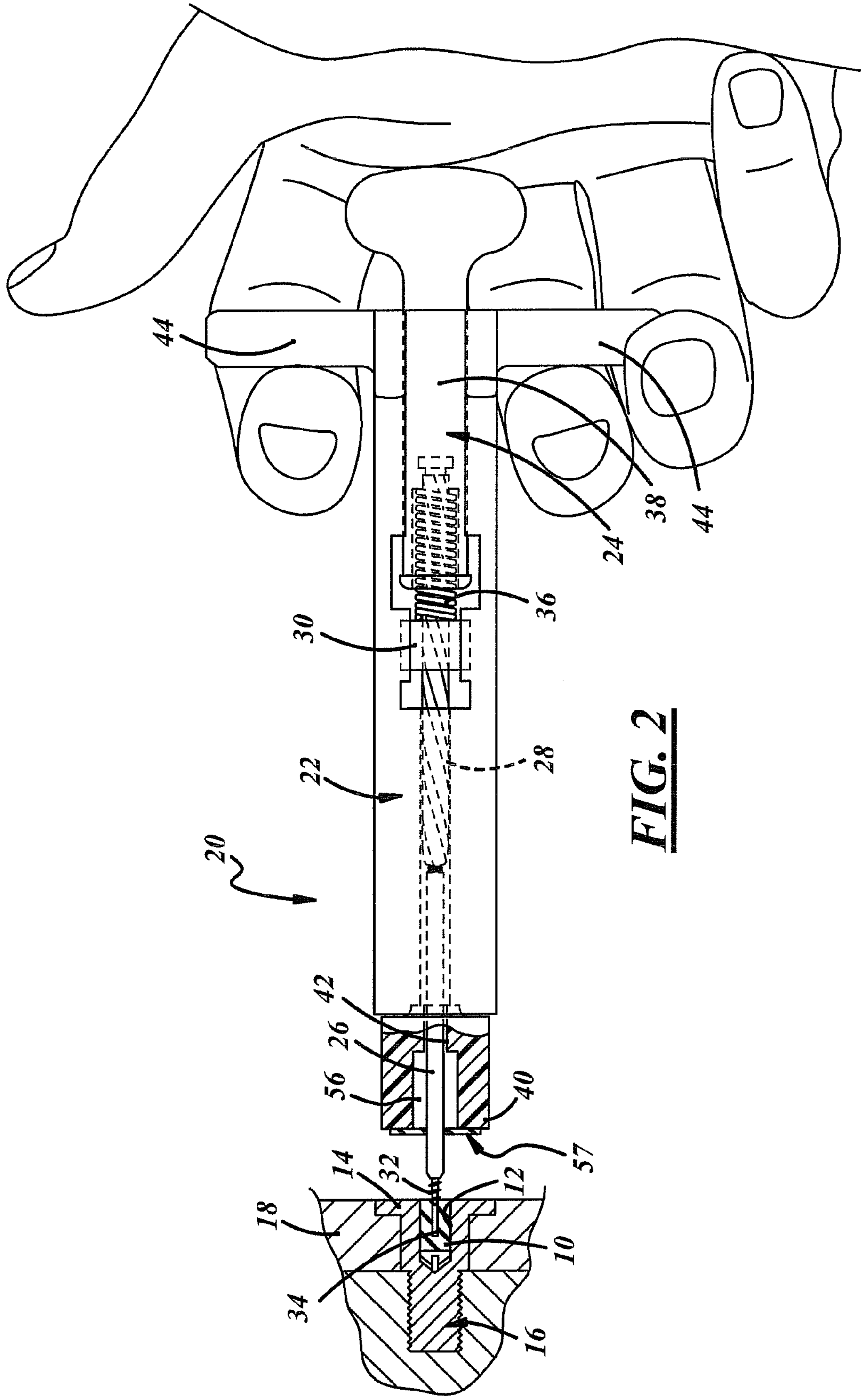
FIG. 2 is a bottom view of the plug removal apparatus and skin panel fastener of FIG. 1 shown with a plug hopper of the apparatus removed for clarity and showing a plunger of the apparatus in an extended position with a threaded tip of a plunger shaft of the plunger shown engaged in a pilot hole of a plug retained in a skin panel fastener.
Figure 3:
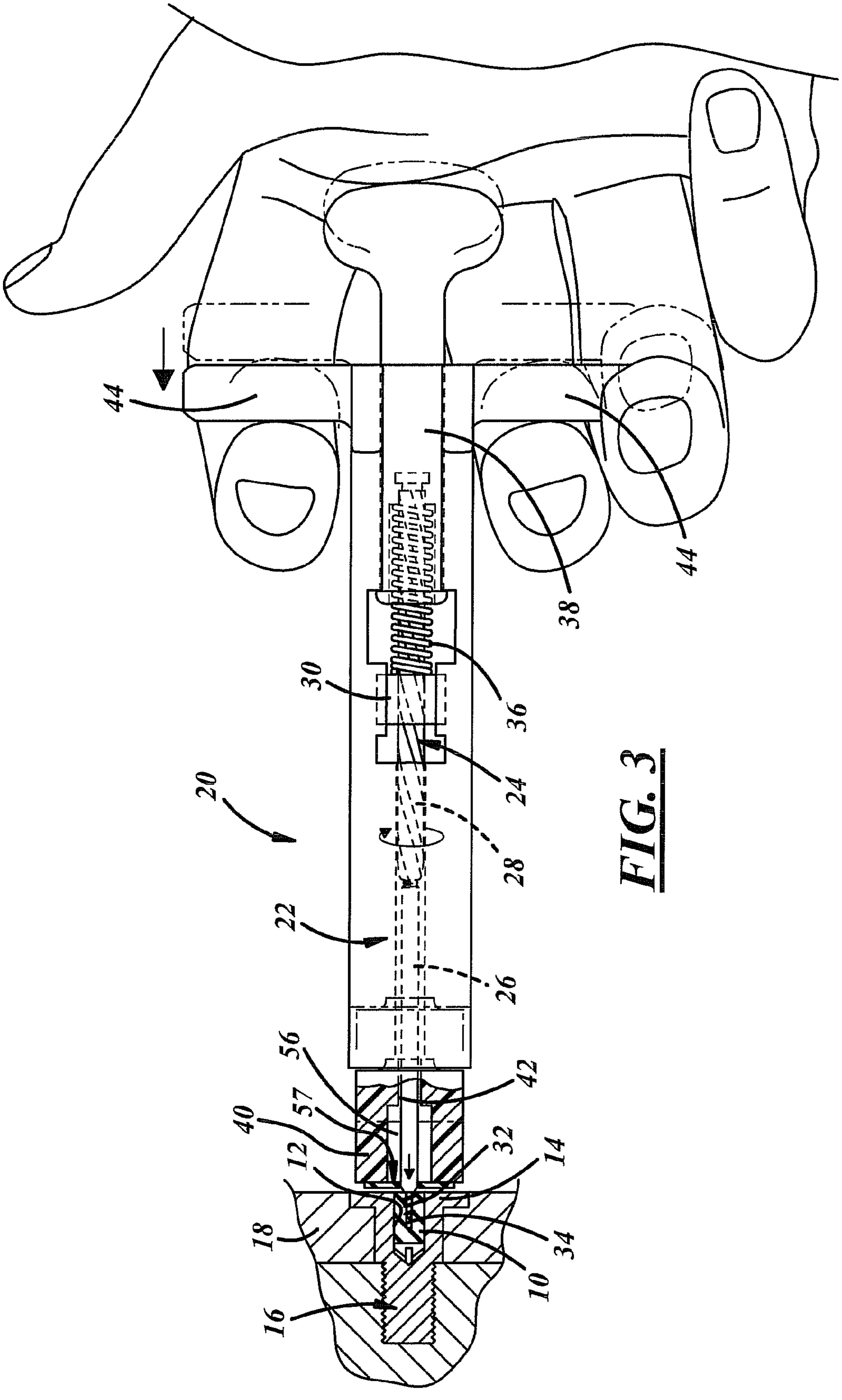
FIG. 3 is second bottom view of the plug removal apparatus and skin panel fastener of FIG. 1 with the plug hopper removed for clarity and showing the plunger retracted to a position between the extended position and a retracted position of the plunger, and further showing the threaded tip of the plunger shaft tapped into the skin panel fastener.
Figure 4:
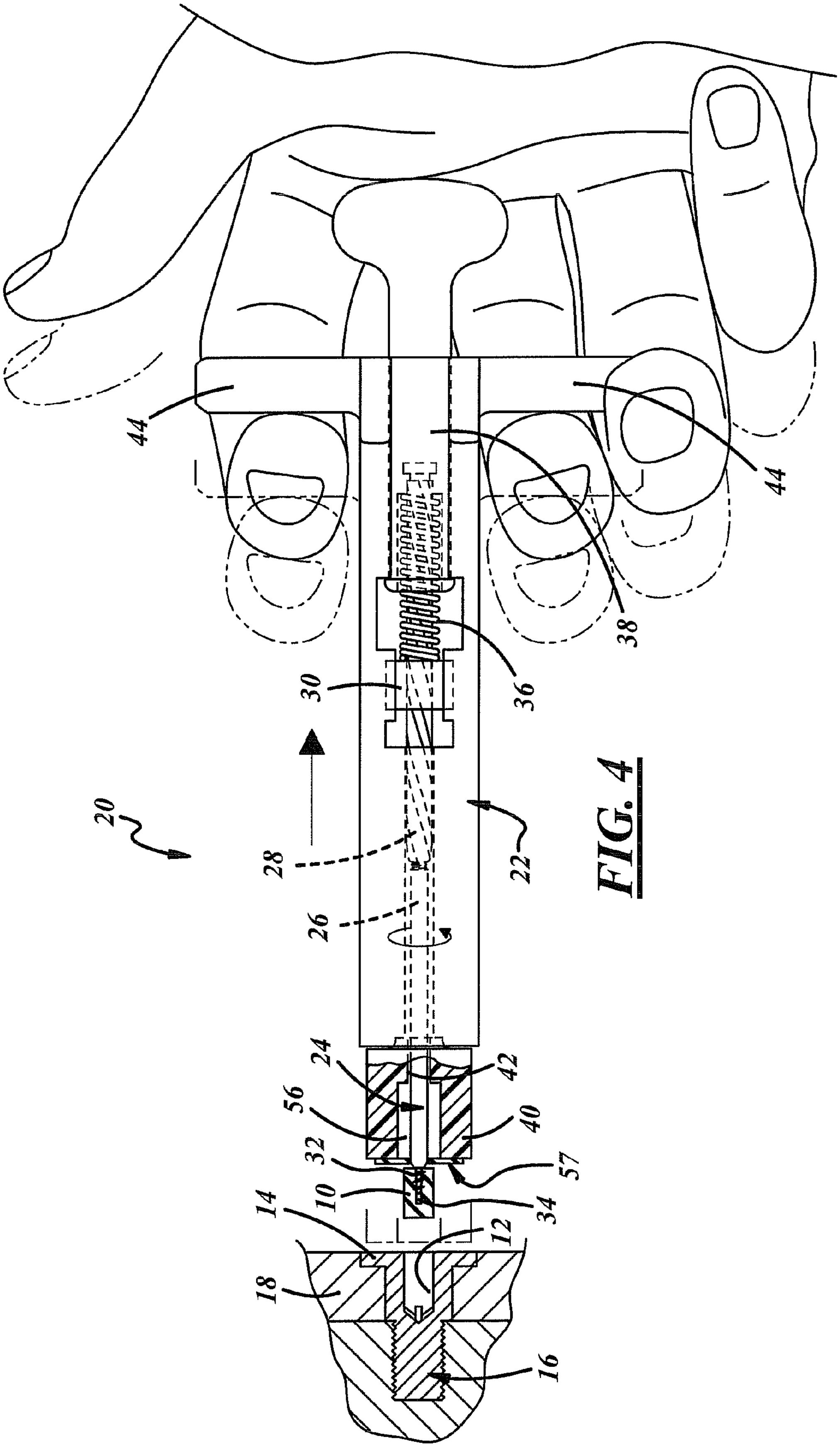
FIG. 4 is a third bottom view of the plug removal apparatus and skin panel fastener of FIG. 1 with the plug hopper removed for clarity and showing the plunger in the same position between extended and retracted positions as in FIG. 3, and further showing the apparatus displaced axially aft from the skin panel fastener with the plug carried by the threaded tip of the plunger shaft.

An apparatus for removing plugs from recesses, e.g., for removing interference fit fastener plugs 10 from tool engagement recesses 12 in the heads 14 of fasteners such as captive fasteners used to retain skin panels 18 on low-observable aircraft, is generally shown at 20 in the drawings. The apparatus 20 may include an elongated, generally rectilinear tubular housing 22 and a plunger 24 carried by and supported in the housing 22 for reciprocal motion between an extended position relative to the housing as shown in FIG. 2, and a retracted position relative to the housing as shown in FIG. 5.

Figure 5:
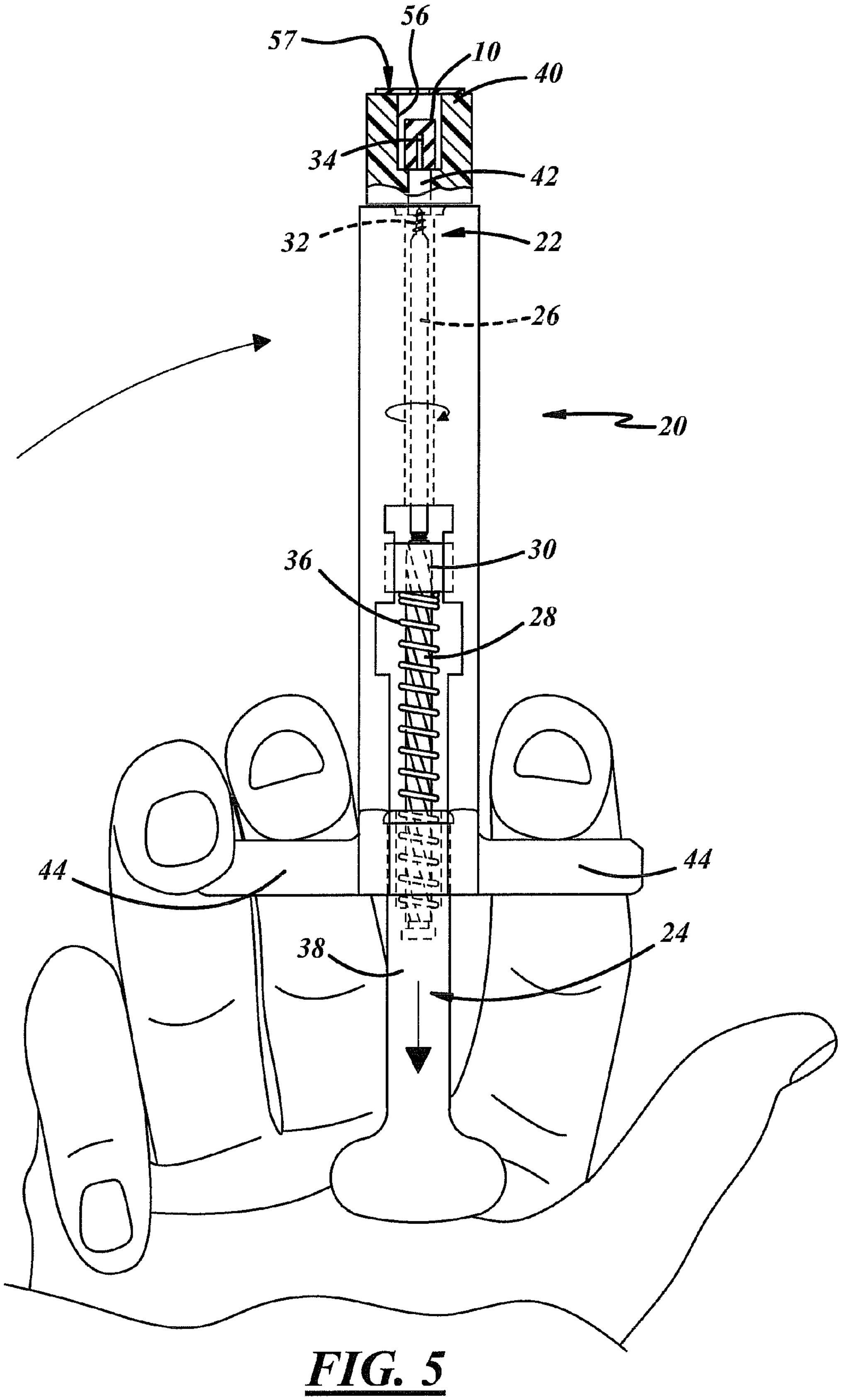
FIG. 5 is a bottom view of the plug apparatus of FIG. 1 with the plug hopper removed for clarity and showing the apparatus in a vertical attitude with the plunger in a retracted position, the plug having been stripped from the threaded tip of the plunger shaft and captured in a receptacle formed in the forward end of the housing.

As best shown in FIG. 5, the plunger 24 may include a generally cylindrical rod-shaped plunger shaft 26 having a first threaded section 28 threadedly engaged in a nut 30 carried by the housing 22. The nut 30 may be carried by the housing 22 in any manner suitable to prevent the nut 30 from rotating relative to the housing 22. The first threaded section 28 may include threads, i.e., helical ridges, flutes, or twists, which are pitched steeply enough (have a relatively large amount of spacing between threads; relatively few threads over a given unit of axial distance along the plunger shaft) to allow axial motion of the plunger shaft 26 relative to the housing 22 to be converted to rotational motion of the plunger shaft 26 relative to the housing 22. The thread pitch of the first threaded section 28 of the plunger shaft 26 may be of any suitable value sufficient to allow a relatively small amount of axial force application to the plunger 24 to overcome friction generated between the nut 30 and the first threaded section 28 of the plunger shaft 26 and to move the shaft 26 axially through the nut 30 and housing 22, causing rotation of the plunger shaft 26 to occur concurrent with axial translation of the plunger shaft 26. For example, the thread pitch of the first threaded section 28 may be in the range of approximately 8.5-2.5 mm (approximately 3 to 10 threads per inch) and, as in the present embodiment, may be approximately 5 mm (approximately 5 threads per inch).

The plunger shaft 26 may include a second threaded section, as shown at 32 in FIGS. 2-5, 7, and 9 which may be disposed at a distal forward end of the plunger shaft 26. The second threaded section 32 may be configured to tap into a softer material such as, for example, a resin used to form fastener plugs, and to do so in response to plunger shaft rotation in a tapping direction. The second threaded section 32 of the plunger shaft 26 may, as in the present embodiment, be in the form of a gimlet carried coaxially by and/or formed on the plunger shaft 26 at the distal forward end of the plunger shaft 26.

The second threaded section 32 may have a shallower thread pitch than the first threaded section 28 (closer thread spacing; more threads over a given unit of axial distance along the plunger shaft) to frictionally prevent relative rotation between the second threaded section 32 and an engaged plug 10 in response to relative axial motion. Aft axial movement of the plunger shaft 26 will thus result in retention of the plug 10 on the second threaded section 32 of the plunger shaft 26 and removal of the plug 10 from its recess 12. The thread pitch of the second threaded section 32 of the plunger shaft 26 may be of any suitable value sufficient to prevent plug rotation and disengagement during extraction. For example, the thread pitch of the second threaded section 32 may be in the range of approximately 2.5 to 0.6 mm (approximately 10 to 40 threads per inch) and, as in the present embodiment, may be approximately 0.8 mm (approximately 32 threads per inch). The threads of the second threaded section 32 may also taper to a point to allow the second threaded section 32 of the plunger shaft 26 to self tap more readily into a very small pilot hole 34 or into a surface having no pilot hole.

The handedness of the second threaded section 32 of the plunger shaft 26 may be opposite that of the first threaded section 28 such that retraction of the plunger shaft 26, i.e., axial motion of the plunger shaft 26 toward the retracted position (housing 22 motion forward relative to the plunger shaft 26) causes plunger shaft 26 rotation in a tapping direction of the second threaded section 32.

As shown in FIGS. 2-5 and 7, the apparatus 20 may also include a spring 36 carried coaxially by the plunger shaft 26 in a position to be compressed between the nut 30 and a forward end of the head or handle 38 of the plunger 24 so as to axially spring bias the plunger 24 toward the retracted position. This allows an operator to cause plunger shaft 26 rotation in the tapping direction of the second threaded section 32 of the plunger shaft 26 by allowing the spring 36 to move the housing 22 forward relative to the plunger 24.

The plunger handle 38 may be connected to an aft end of the plunger shaft 26 in a manner that allows the plunger shaft 26 to rotate freely relative to the plunger handle 38. This allows an operator to engage and push or maintain pressure axially against the plunger handle 38 with the operator's thumb or a heel of the operator's hand, as shown in FIGS. 2-5, without impeding rotation of the plunger shaft 26.

Figure 1:
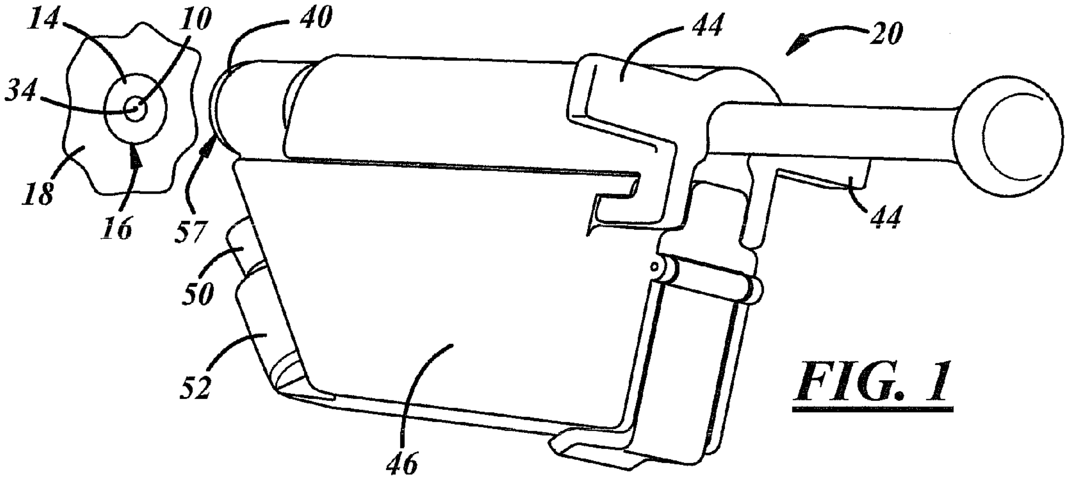
FIG. 1 is a perspective left-side view of a plug removal apparatus positioned in an upright attitude adjacent an aircraft skin panel fastener carrying a plug to be removed.
Figure 7:
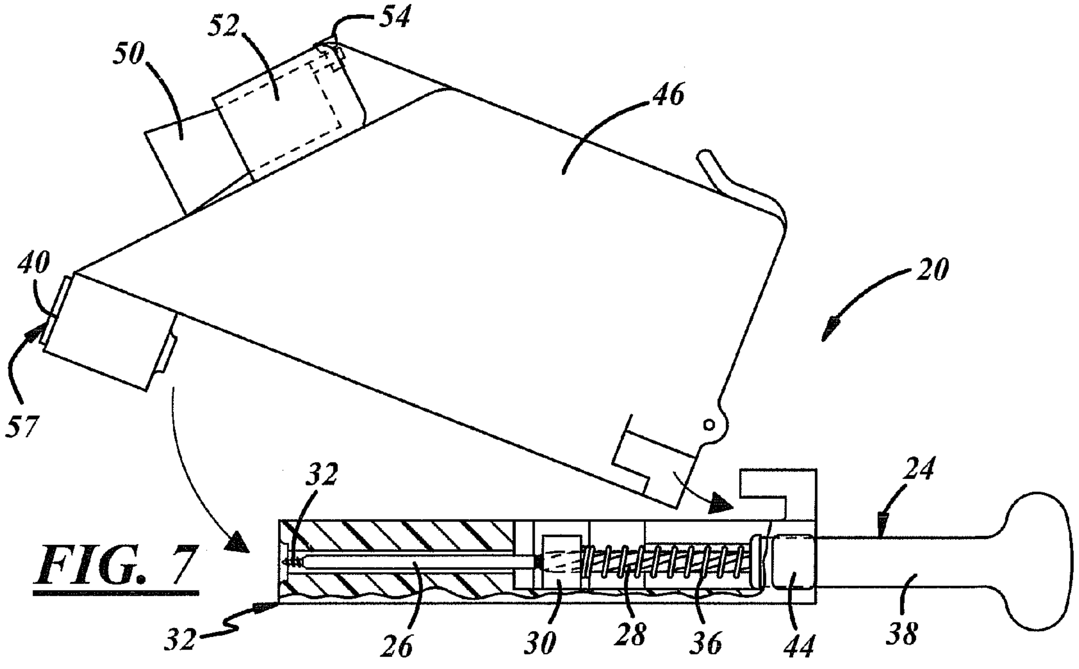
FIG. 7 is a partially cut-away side view of the plug removal apparatus of FIG. 1 with the apparatus shown in an inverted attitude with the plug hopper removed.

The plunger 24 and housing 22 may be configured such that the second threaded section 32 of the plunger shaft 26 protrudes from a forward end or nose 40 of the housing 22 when the plunger 24 is held in or near its extended position against the spring bias as shown in FIGS. 1-4. This exposes the second threaded section 32 so that its forward tip can be engaged against a fastener plug 10 that's to be removed. In addition, the plunger 24 and housing 22 may be configured such that the second threaded section 32 of the plunger shaft 26 is withdrawn into the housing 22 when the plunger 24 is in its retracted position as shown in FIGS. 1, 5, and 7. This stows the second threaded section 32 in a location where it will be unlikely to cause injury when the apparatus is not in use. In addition, a nose 40 of the housing 22 may include a plunger shaft hole 42 shaped to prevent the passage of a fastener plug 10 carried by the second threaded section 32, so that retraction of the plunger 24 will strip any engaged fastener plug 10 from the second threaded section 32 of the plunger shaft 26.

As shown in FIGS. 1 and 2-5, the housing 22 may include finger tabs 44 that extend integrally and laterally in diametrically opposite directions from an aft end of the housing 22. The finger tabs 44 may be used to facilitate one-handed control of plunger position relative to the housing 22. As with a syringe, an operator can push the plunger 24 forward relative to the housing 22 (and/or pull the housing 22 back relative to the plunger 24) by engaging and pushing axially against the plunger handle 38 with the heel or thumb of one hand while engaging and pulling axially back on the finger tabs 44 with fingers of the same hand.

Figure 6:
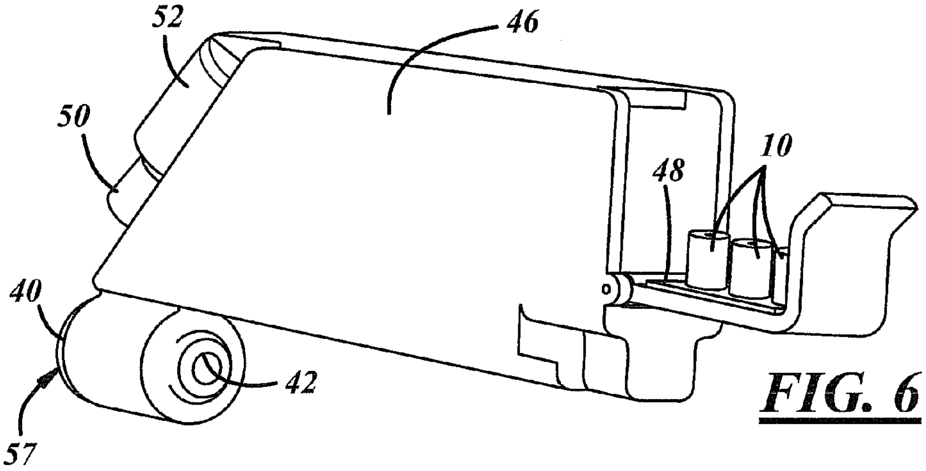
FIG. 6 is a perspective view of a plug hopper of the plug removal apparatus of FIG. 1 and showing the plug hopper in an inverted attitude with a trap door of the plug hopper shown in an open position with fastener plugs magnetically retained on a magnetic strip carried by the trap door.

As best shown in FIGS. 1, 6, and 7, the housing 22 may include a detachable plug hopper 46 configured to store fastener plugs 10 as the plugs are removed from fasteners 16. The plug hopper 46 thus helps to prevent the loss of the plugs 10 and the possible subsequent interference of the plugs 10 with other aircraft systems or their ingestion by aircraft engines.

A magnetic strip 48 may be carried by the plug hopper 46 and positioned, as shown in FIG. 6, to retain fastener plugs 10, e.g., plugs comprising a resin with a ferrous filler. The magnetic strip 48 may be carried by an inner surface of a pivoting trap door of the plug hopper 46 so that removed plugs 10 can be magnetically adhered to the strip 48 and then the trap door closed to secure the plugs 10 within the plug hopper 46.

As shown in FIGS. 1, 6, 7, 9, and 10 the apparatus may include a lamp 50 that may be removably carried by a lamp cradle 52 formed on the plug hopper 46 and positioned to direct a beam of light generally toward a position where the second threaded section 32 of the plunger shaft 26 is located when the plunger shaft 26 is in its extended position. When the second threaded section 32 of the plunger shaft 26 is engaged against a fastener plug 10 or other item to be extracted, the beam of light from the lamp 50 will illuminate that area, e.g., the outer surface of a fastener plug 10, that is to be tapped into by the second threaded section 32 of the plunger shaft 26. A set screw, shown at 54 in FIG. 7, passes through an opening in the lamp 50 and is threadable into the plug hopper 46 to hold the lamp 50 securely in place in the lamp cradle 52. The set screw 54 can be easily removed when it's necessary to remove the lamp 50 to renew a battery powering the lamp 50. The lamp 50 may be of any suitable type to include a Streamlight Nano Micro LED Flashlight.

The lamp 50 may be carried on a forward wall of the plug hopper 46 as shown in FIGS. 1, 6, and 7. The forward wall carrying the lamp 50 may be ramped such that the cradle 52 carries the lamp 50 in a position where a beam of light emitted by the lamp 50 will be directed toward the position described above, but where the lamp 50 is displaced axially aft of the nose 40 of the housing 22. This positions the lamp 50 farther from a surface, such as the skin of an aircraft, from which fastener plugs 10 are being removed, so that the danger of lamp 50 contact with and abrasion of the surface is reduced.

The nose 40 of the housing 22 may include a cylindrical plug receptacle 56 recess disposed coaxially with the plunger shaft 26 and the plunger shaft hole 42 through which the plunger shaft 26 extends when in its extended position. The plug receptacle 56 may be configured and positioned to receive an extracted fastener plug 10 as the plug 10 is stripped from the second threaded section 32 of the plunger shaft 26 during retraction of the plunger shaft 26 into the housing 22. The plug receptacle 56 may be further configured and shaped to retain the fastener plug 10 if the apparatus 20 is held in a generally nose up attitude, as shown in FIG. 5, during plunger shaft 26 retraction. The plug receptacle 56 provides an operator with a way of retaining and keeping track of an extracted fastener plug 10 after it's been stripped from the second threaded section 32 of the plunger shaft 26 via plunger shaft 26 retraction. The plug receptacle 56 also allows an operator to easily transfer a removed plug 10 to the operator's hand so that the extracted plug 10 can then be deposited in a secure location or container such as the plug hopper 46.

Figure 8:
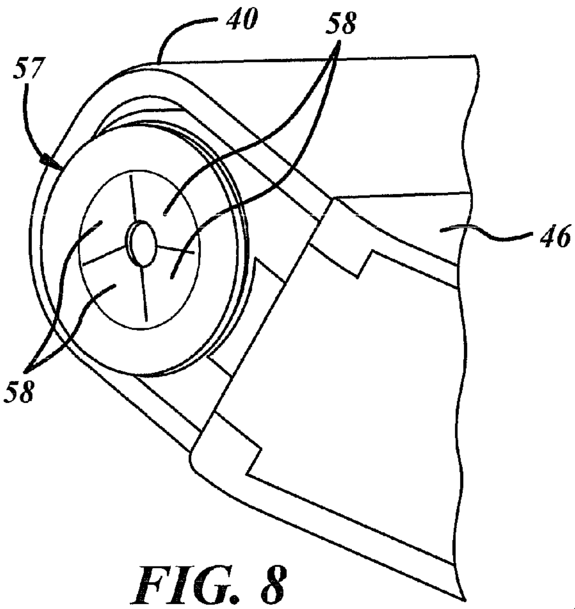
FIG. 8 is a magnified fragmentary perspective view of the plug removal apparatus of FIG. 1 showing a front surface of a plug retainer disk carried by the apparatus housing and with the plunger in its retracted position.
Figure 9:
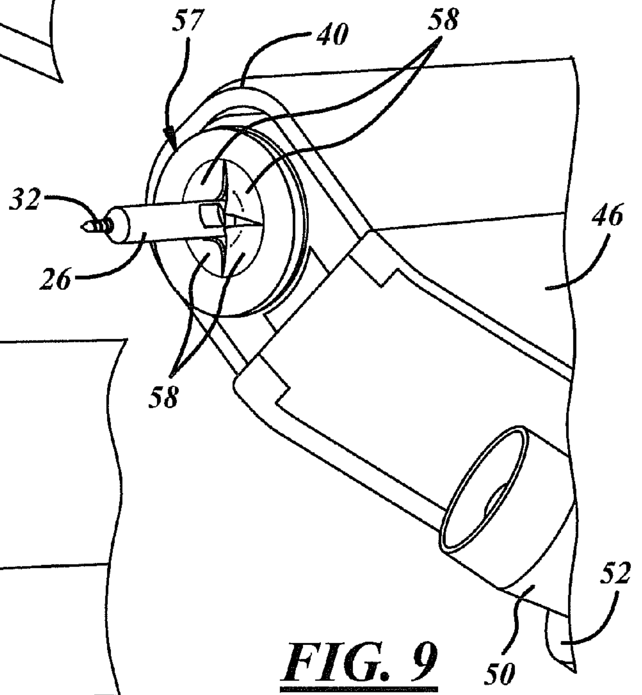
FIG. 9 is a magnified fragmentary perspective view of the plug removal apparatus of FIG. 1 showing the plunger in its extended position passing through the plug retainer disk.
Figure 10:
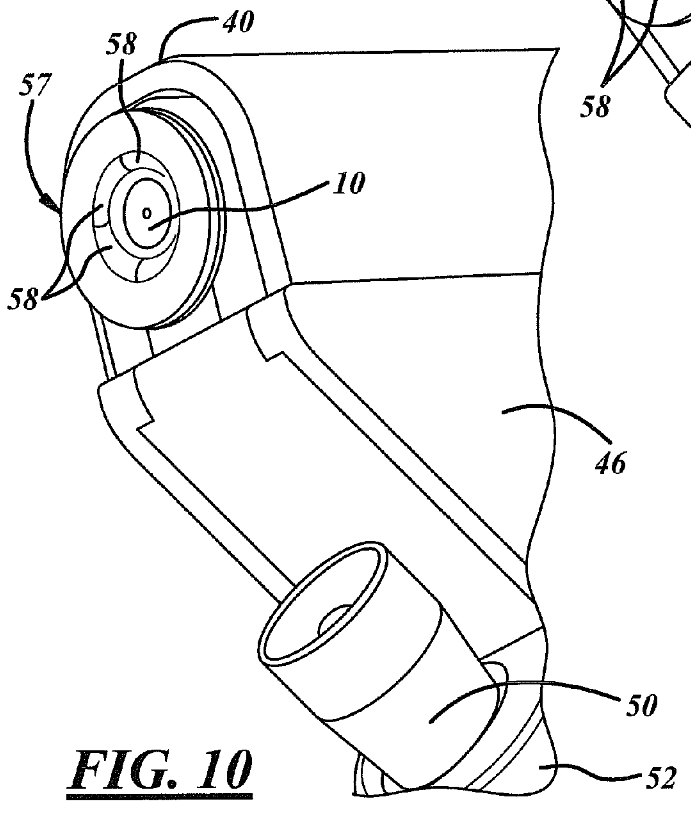
FIG. 10 is a magnified fragmentary perspective view of the plug removal apparatus of FIG. 1 showing the plunger between its extended and retracted positions and with a fastener plug being carried through the plug retainer disk into a plug receptacle of the apparatus.

As best shown in FIGS. 8-10, a flat, torroidal plug retainer disk 57 may be carried by the nose 40 of the housing 22. The disk 57 may comprise rubber or any other suitably soft, resilient material, and may include flaps 58 positioned to flex to allow passage of a retracting fastener plug 10 into the plug receptacle 56 as shown in FIG. 10, and to then return to respective closed positions, as shown in FIG. 8, to prevent the plug 10 from dropping out of the plug receptacle 56 after being stripped from the second threaded section 32 of the plunger shaft 26. The plug retainer disk 57 may be adhered to the nose 40 of the housing 22 by any known suitable means to include the application of an adhesive.

Figure 11:
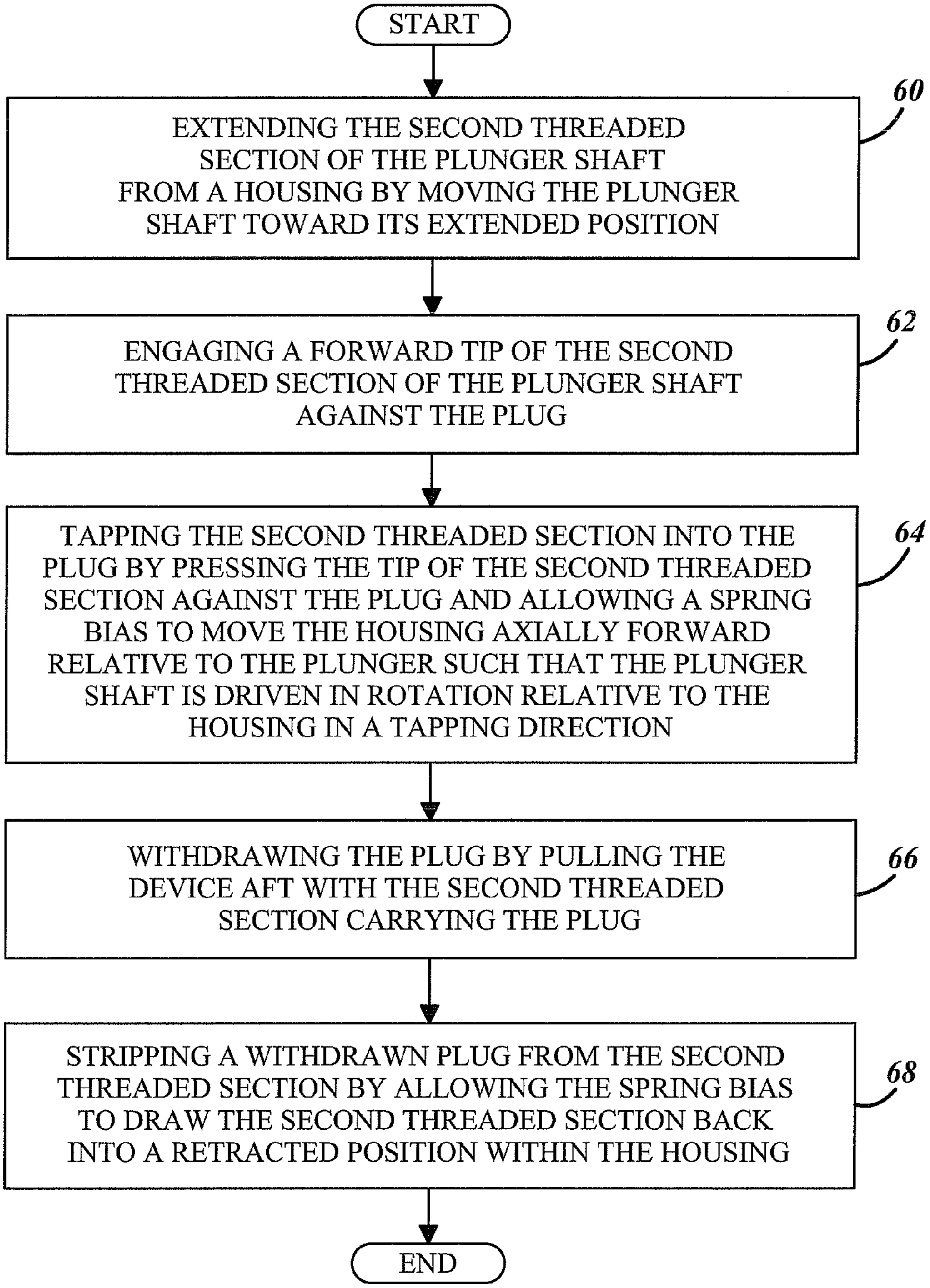
FIG. 11 is a high level flow diagram of a method for removing plugs from recesses.

In practice, and as shown in the process flow diagram of FIG. 11, a plug may be removed from a recess (e.g., a fastener plug 10 from a tool engagement recess 12 in the head 14 of a fastener 16) by first extending the second threaded section 32 of the plunger shaft 26 from the housing 22 against the spring bias by moving the plunger shaft 26 toward its extended position as indicated in action step 60. A forward tip of the second threaded section 32 of the plunger shaft 26 may then be engaged against the plug 10 as indicated in action step 62. As indicated in action step 64 the second threaded section 32 may then be tapped into the plug 10 by pressing the forward tip of the second threaded section 32 against the plug 10 and moving the housing 22 axially relative to the plunger 24 such that the plunger shaft 26 is driven in rotation in a "tapping direction" relative to the plunger handle 38, housing 22, and the plug 10. Where the handedness of the second threaded section 32 is opposite that of the first threaded section 28 of the plunger shaft 26, the spring bias is allowed to move the housing 22 axially forward relative to plunger 24 such that the plunger shaft 26 is driven in rotation in the tapping direction relative to the plunger handle 38, the housing 22, and the plug 10.

Once it's been tapped into and engaged, the plug 10 may be withdrawn by pulling the apparatus 20 aft as indicated in action step 66. The plug 10 is retained on the second threaded section 32 of the plunger shaft 26 securely enough to remain engaged on the second threaded section 32 during extraction.

As indicated in action step 68, the withdrawn plug 10 may then be stripped from the second threaded section 32 by allowing the spring bias to draw the plunger 24 back into a retracted position. This draws the second threaded section 32 of the plunger shaft 26 back into the housing 22 through the plunger shaft hole 42 in the nose 40 of the housing 22. Because the plunger shaft hole 42 is too small to allow passage of the plug 10, the withdrawal of the second threaded section 32 through the hole in the nose 40 of the housing 22 strips the plug 10 from the plunger shaft 26. If the apparatus 20 is held in a generally nose-up position during this stripping operation, the plug 10 will remain within the plug receptacle 56 formed in the nose 40 of the housing 22. The operator may then tip the plug 10 out of the housing 22 into the operator's hand, open the trap door on the plug hopper 46, and place the plug 10 on the metal strip 48 carried by the trap door. The trap door may then be closed, securing the plug 10 inside the plug hopper 46.

Among other things, a fastener plug 10 extraction apparatus 20 constructed according to the invention provides a more ergonomic solution to the problem of how to threadedly engage and remove a fastener plug 10 without requiring a twist of an operator's wrist—an action that must be accomplished multiple times when, for example, removing an aircraft skin panel 18 held in place by multiple fasteners 16.

This description, rather than describing limitations of an invention, only illustrates an embodiment of the invention recited in the claims. The language of this description is therefore exclusively descriptive and non-limiting. Obviously, it's possible to modify this invention from what the description teaches. Within the scope of the claims, one may practice the invention other than as described above.

What is claimed is:

1. An apparatus for removing plugs from recesses, the apparatus comprising:

a housing;

a nut carried by the housing; and a plunger carried by the housing and supported for reciprocal axial motion between extended and retracted positions relative to the housing, the plunger including a plunger shaft having:

a first threaded section threadedly engaged in the nut and including threads pitched to convert relative axial motion to relative rotation between the plunger shaft and the housing; and a second threaded section at a forward end of the plunger shaft, the second threaded section being configured to tap into a plug comprising softer material in response to shaft rotation in a tapping direction;

the second threaded section of the plunger shaft having a shallower thread pitch than the first threaded section.

2. An apparatus as defined in claim 1 in which the handedness of the second threaded section of the plunger shaft is opposite that of the first threaded section.

3. An apparatus as defined in claim 1 in which the plunger is axially biased toward the retracted position.

4. An apparatus as defined in claim 1 in which the plunger includes a plunger head connected to an aft end of the plunger shaft in a manner that allows for plunger shaft rotation relative to the plunger head.

5. An apparatus as defined in claim 1 in which the second threaded section:

protrudes from a forward end of the housing when the plunger is in its extended position; and is withdrawn into the housing when the plunger is in its retracted position.

6. An apparatus as defined in claim 1 in which finger tabs extend laterally from an aft end of the housing.

7. An apparatus as defined in claim 1 in which the second threaded section comprises threads that taper to a point.

8. An apparatus as defined in claim 1 in which the housing includes a plug hopper configured to store plugs.

9. An apparatus as defined in claim 8 in which a magnetic strip is carried by the plug hopper in a position to retain plugs comprising a ferrous filler.

10. An apparatus as defined in claim 8 further including a lamp carried by the plug hopper and positioned to direct a beam of light generally toward a position where the second threaded section is located when the plunger shaft is in its extended position.

11. An apparatus as defined in claim 10 in which a forward wall of the plug hopper carries the lamp, the forward end of the plug hopper being ramped so as to carry the lamp in a position displaced axially aft of a forward end of the housing.

12. An apparatus as defined in claim 1 in which a forward end of the housing includes a recess disposed coaxially with the plunger shaft and a plunger shaft opening and is configured and positioned to receive a removed plug as the plunger shaft is retracted into the housing through the plunger shaft opening, and is further configured to retain the plug.

13. An apparatus as defined in claim 12 further including a plug receptacle carried by the housing and including flaps positioned to flex to allow passage of a retracting fastener plug into the plug receptacle and to then return to respective closed positions to prevent the plug from dropping out of the plug receptacle after being stripped from the second threaded section of the plunger shaft.

14. An apparatus as defined in claim 1 in which the thread pitch of the first threaded section of the plunger shaft is in the range of approximately 2.5 to 8.5 mm.

15. An apparatus as defined in claim 1 in which the thread pitch of the first threaded section of the plunger shaft is approximately 5 mm.

16. An apparatus as defined in claim 1 in which the thread pitch of the second threaded section of the plunger shaft is in the range of approximately 0.6 to 2.5 mm.

17. An apparatus as defined in claim 1 in which the thread pitch of the second threaded section of the plunger shaft is approximately 0.8 mm.

18. A method for removing plugs from recesses, the method including the steps of:

providing an apparatus comprising a plunger supported in a housing for reciprocal motion between extended and retracted positions relative to the housing and including a plunger shaft having a first threaded section threadedly engaged in a nut carried by the housing, the first threaded section including threads pitched steeply enough to allow relative axial motion to be converted to rotational shaft motion relative to the housing, and a second threaded section at a forward end of the plunger shaft and configured to tap into a softer material, the second threaded section of the plunger shaft including threads pitched less steeply than the threads of the first threaded section and sufficiently shallow to frictionally prevent relative rotation in response to relative axial motion;

extending the second threaded section of the plunger shaft from the housing by moving the plunger shaft toward its extended position;

engaging a forward tip of the second threaded section of the plunger shaft against the plug;

tapping the second threaded section into the plug by pressing the tip of the second threaded section against the plug and moving the housing axially relative to the plunger such that the plunger shaft is driven in rotation relative to the housing in a tapping direction; and withdrawing the plug by pulling the device aft with the second threaded section carrying the plug.

19. The method of claim 18 in which:

the step of providing an apparatus includes providing a plunger shaft having first and second threaded sections, which are threaded in opposite directions; the step of providing an apparatus further includes providing a spring positioned to bias the plunger toward the retracted position; and the step of tapping the second threaded section includes allowing a spring bias to move the housing axially forward relative to plunger such that the plunger shaft is driven in rotation relative to the housing in the tapping direction.

20. The method of claim 19 including the additional step of stripping an extracted plug from the second threaded section by allowing the spring bias to draw the second threaded section back into a retracted position within the housing.

* * * * *